(12) United States Patent
Baek et al.

(10) Patent No.: US 8,652,663 B2
(45) Date of Patent: Feb. 18, 2014

(54) PRISMATIC SECONDARY BATTERY

(75) Inventors: Wongseong Baek, Yongin-si (KR); Heuisang Yoon, Yongin-si (KR); Sangjoo Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 294 days.

(21) Appl. No.: 13/064,668

(22) Filed: Apr. 7, 2011

(65) Prior Publication Data

US 2012/0070697 A1 Mar. 22, 2012

(30) Foreign Application Priority Data

Sep. 16, 2010 (KR) ........................ 10-2010-0090920

(51) Int. Cl.
*H01M 14/00* (2006.01)
(52) U.S. Cl.
USPC .................. 429/7; 429/62; 429/175; 429/185
(58) Field of Classification Search
None
See application file for complete search history.

(56) References Cited

U.S. PATENT DOCUMENTS

| 2007/0231686 | A1 | 10/2007 | Kim | |
| 2009/0130554 | A1* | 5/2009 | Jang et al. | 429/179 |
| 2010/0316892 | A1* | 12/2010 | Kim | 429/7 |
| 2011/0070466 | A1* | 3/2011 | Park et al. | 429/7 |
| 2012/0129012 | A1* | 5/2012 | Baek | 429/7 |

FOREIGN PATENT DOCUMENTS

| JP | 2002-231201 A | 8/2002 |
| JP | 2008-004670 A | 1/2008 |
| KR | 10 2006-0134401 A | 12/2006 |
| KR | 10 2007-0097153 A | 10/2007 |
| KR | 10 2009-0064026 A | 6/2009 |

* cited by examiner

*Primary Examiner* — Milton I Cano
*Assistant Examiner* — Carmen Lyles-Irving
(74) *Attorney, Agent, or Firm* — Lee & Morse, P.C.

(57) ABSTRACT

A secondary battery includes an electrode assembly having a positive electrode tab and a negative electrode tab, a can housing the electrode assembly, a cap assembly sealing a top opening of the can, and a protective circuit module in a space between the cap assembly and the electrode assembly.

17 Claims, 3 Drawing Sheets

PRISMATIC SECONDARY BATTERY

This application claims the benefit of foreign application Republic of Korea 10-2010-0090920 filed Sep. 16, 2010.

BACKGROUND

1. Field

Embodiments relate to a prismatic secondary battery.

2. Description of the Related Art

A secondary battery may be formed by accommodating an electrode assembly in a metal can and injecting an electrolyte into the can. Then, the can may be hermetically sealed. The electrode assembly may include a including a positive electrode plate, a negative electrode plate, and a separator. An electrode terminal may be disposed on the secondary battery. The electrode terminal may be insulated from the can. The electrode terminal may serve as one electrode terminal of the battery. The can may serve as the other electrode terminal of the battery.

SUMMARY

At least one of the embodiments may be realized by providing a secondary battery, including an electrode assembly having a positive electrode tab and a negative electrode tab, a can housing the electrode assembly, a cap assembly sealing a top opening of the can, and a protective circuit module in a space between the cap assembly and the electrode assembly.

The secondary battery may further include an insulating case on the electrode assembly, the insulating case being between the protective circuit module and the electrode assembly.

The insulating case may include a second hole in which an electrolyte injection hole in a cap plate is inserted, a positive electrode tab hole through which the positive electrode tab passes, and a negative electrode tab hole through which the negative electrode tab passes.

The insulating case may be made of electrically insulating material.

The electrolyte injection hole may allow an electrolyte to flow into the can without leaking between the cap plate and the insulating case.

The protective circuit module may be formed by combining a protective circuit board with a secondary protective device, the secondary protective device being electrically connected to the protective circuit board to prevent current from flowing through a circuit when there is an over-current condition.

The protective circuit module may further include a protective circuit element for charging and discharging operations.

The protective circuit module may include a positive electrode lead plate at a location corresponding to the positive electrode tab, and the secondary protective device may include a negative electrode lead plate at one side of the secondary protective device.

The positive electrode lead plate may be electrically connected to the positive electrode tab, and the negative electrode lead plate may be electrically connected to the negative electrode tab.

A bottom of the protective circuit module, excluding the positive electrode lead plate and the negative electrode lead plate, may be molded using a resin.

The cap assembly may include a cap plate, a negative electrode terminal inserted into a throughhole passing through the center of the cap plate, and an insulation gasket insulating the cap plate, and the negative electrode terminal from each other.

The negative electrode terminal and the cap plate may have different polarities.

A first receiving groove may be on a bottom surface of the cap plate, the first receiving groove being at a location corresponding to a protective circuit element on the protective circuit module, the first receiving groove having a size and a shape corresponding to the protective circuit element.

A second receiving groove may be on a bottom surface of the cap plate, the second receiving groove being at a location corresponding to a secondary protective device, the second receiving groove having a size and a shape corresponding to the secondary protective device.

A second positive electrode pad may be on the bottom surface of the cap plate, and a first positive electrode pad may be on the top surface of the protective circuit module, the first positive electrode pad being electrically connected to the second positive electrode pad.

A negative electrode pad may be on the top surface of the protective circuit module, corresponding to the location of the negative electrode terminal, the negative pad being electrically connected to the negative electrode terminal.

The second positive electrode pad and the first positive electrode pad may be coupled to each other by welding, and the negative electrode terminal and the negative electrode pad are coupled to each other by welding.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Korean Patent Application No. 10-2010-0090920, filed on Sep. 16, 2010, in the Korean Intellectual Property Office, and entitled: "Prismatic Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the inventive concept to those skilled in the art.

It is a feature of an embodiment to provide a prismatic secondary battery, which may reduce a space occupied by a protective circuit module by providing a protective circuit module within a can.

Figure 1:
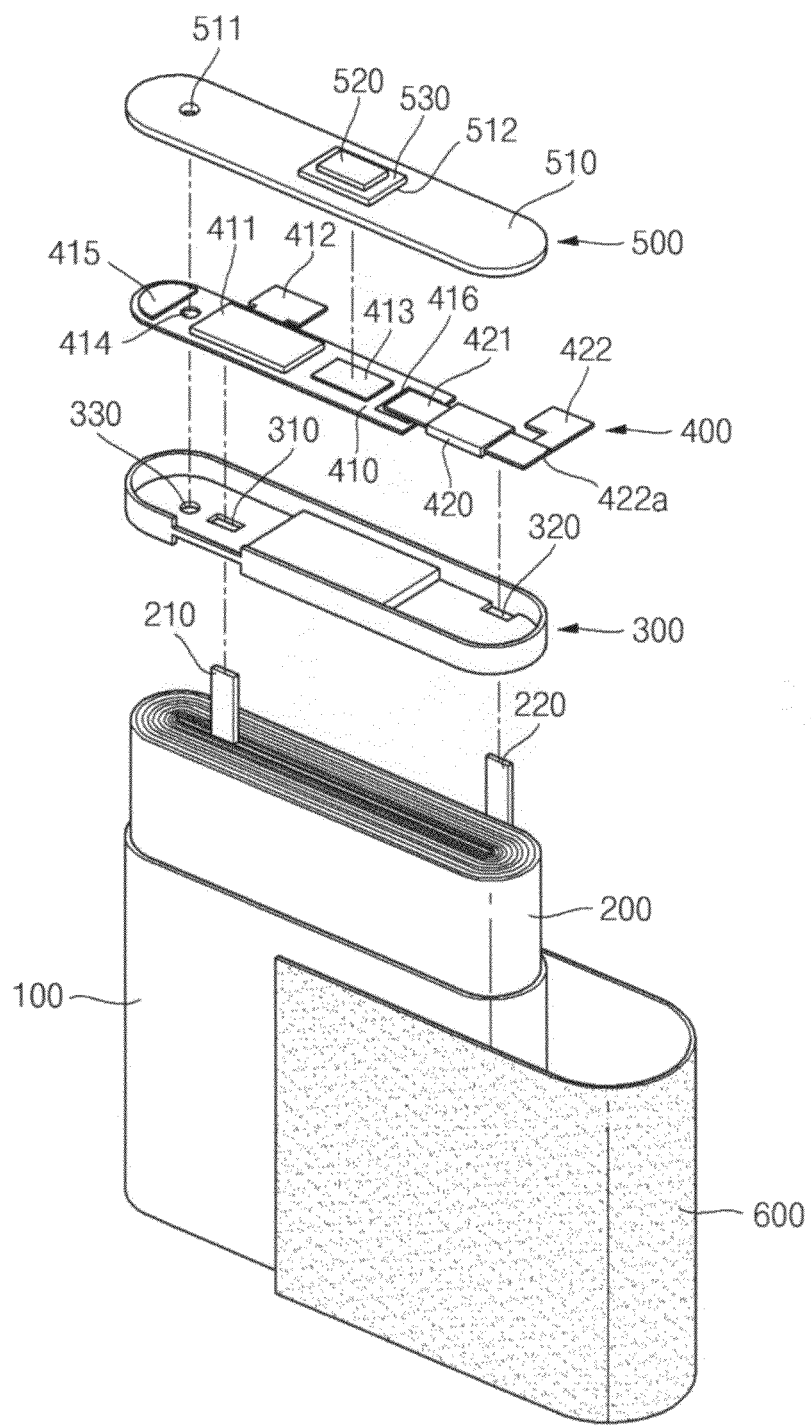
FIG. 1 illustrates an exploded perspective view of a secondary battery according to an embodiment.
Figure 2:
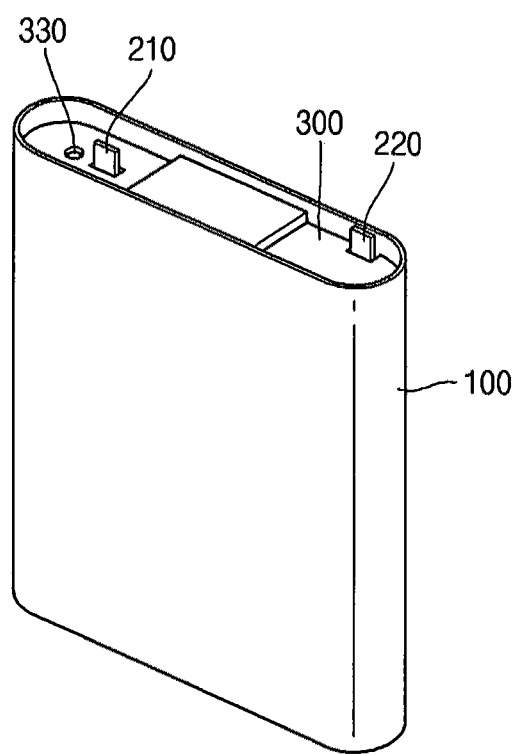
FIG. 2 illustrates a perspective view of a can and an insulating case combined with each other in the secondary battery shown in FIG. 1.

FIG. 1 illustrates an exploded perspective view of a secondary battery according to an embodiment. FIG. 2 illustrates a perspective view of a can and an insulating case combined with each other in the secondary battery shown in FIG. 1. FIG.

3 illustrates a perspective view of a protective circuit module and a bottom surface of a cap assembly in the secondary battery shown in FIG. 1.

Referring to FIG. 1, the secondary battery according to the present embodiment includes a can 100, an electrode assembly 200 accommodated inside the can 100, an insulating case 300 inserted into a top opening of the can 100, a protective circuit module 400 on the insulating case 300, and a cap assembly 500. The cap assembly 500 may be on the protective circuit module 400 and electrically connected to the protective circuit module 400. The secondary battery according to the present embodiment may further include a label 600 surrounding the outer circumferential surface of the can 100.

The electrode assembly 200 may include a positive electrode plate, a negative electrode plate, and a separator. The positive electrode plate and the negative electrode plate may be stacked with the separator interposed therebetween. The positive electrode plate and the negative electrode plate may be wound in a jelly-roll configuration.

A positive electrode tab 210 may be welded to the positive electrode plate, and one end of the positive electrode tab 210 may protrude upwardly from the electrode assembly 200. A negative electrode tab 220 may be welded to the negative electrode plate. One end of the negative electrode tab 220 may protrude upwardly from the electrode assembly 200. Polarities of the positive electrode tab 210 and the negative electrode tab 220 may be reversed.

The can 100 may be formed of a metal member having a roughly rectangular parallelepiped shape. The can 100 may have an open top end, forming a top opening. The electrode assembly 200 may be received through the top opening.

The can 100 may serve as an electrode terminal, which may have a polarity opposite to that of the electrode terminal 520. Since polarities of the positive electrode tab 210 and the negative electrode tab 220 can be reversed, the electrode terminal 520 may be either a positive electrode terminal or a negative electrode terminal. When the electrode terminal 520 is a positive electrode terminal, the can 100 may serve as a negative electrode terminal. When the electrode terminal 520 is a negative electrode terminal, the can 100 may serve as a positive electrode terminal. Hereinafter, for convenience, the can 100 will be described as a negative electrode terminal and the electrode terminal 520 will be described as a positive electrode terminal.

The insulating case 300 may have a shape corresponding to the top opening of the can 100. The insulating case 300 may be inserted into the top opening and combined with the can 100.

Referring to FIG. 2, the insulating case 300 is inserted into the top opening of the can 100 to form a space between the top opening and a top surface of the insulating case 300. The protective circuit module 400 may be received in the space.

The insulating case 300 may include a positive electrode tab hole 310, through which the positive electrode tab 210 passes. The positive electrode tab 210 may be drawn out from the electrode assembly 200. The insulating case 300 may include a negative electrode tab hole 220, through which the negative electrode tab 220 passes. The insulating case 300 may include a second hole 330. The second hole 330 may have a size large enough to allow an electrolyte injection hole 511, which may protrude from the cap plate 510, to be inserted. The second hole 330 may be formed to correspond in location to the electrolyte injection hole 511. The electrolyte injection hole 511 may be part of the cap plate 510. The insulating case 300 may be made of electrically insulating material, such that the electrode assembly 200 is electrically insulated from the protective circuit module 400.

When the protective circuit module 400 is molded using a resin, the insulating case 300 may not be formed.

The protective circuit module 400 may be coupled to an upper portion of the insulating case 300. The protective circuit module 400 may be formed in the space between the top opening and the insulating case 300. Thus, the protective circuit module 400 may be formed inside the can 100. Therefore, in the secondary battery, according to the present embodiment, additional volume, other than the volume occupied by the can 100, is not occupied by the protective circuit module 400. Thus, the capacity relative to the volume of the secondary battery may be increased.

The protective circuit module 400 may include a protective circuit board 410 and a secondary protective element 420. The protective circuit board 410 may have a protective circuit element 411 mounted on the protective circuit board 410. The protective circuit board 410 and the secondary protective element 420 may be combined with each other by welding a first connection terminal 410 provided at one side of the protective circuit board 410, and a second connection terminal 421 provided at the other side of the second secondary protective element 420.

The protective circuit board 410 may include a wire pattern (not shown) mounted on the protective circuit board 410. The protective circuit element 411 may be electrically connected to the wire pattern. The protective circuit element 411 may be provided on a top surface of the protective circuit board 410. The protective circuit element 411 may control charging and discharging operations of the secondary battery.

A positive electrode lead plate 412 may be electrically connected to the positive electrode tab 210. The wire pattern may be provided on a bottom surface of the protective circuit board 410.

Figure 3:
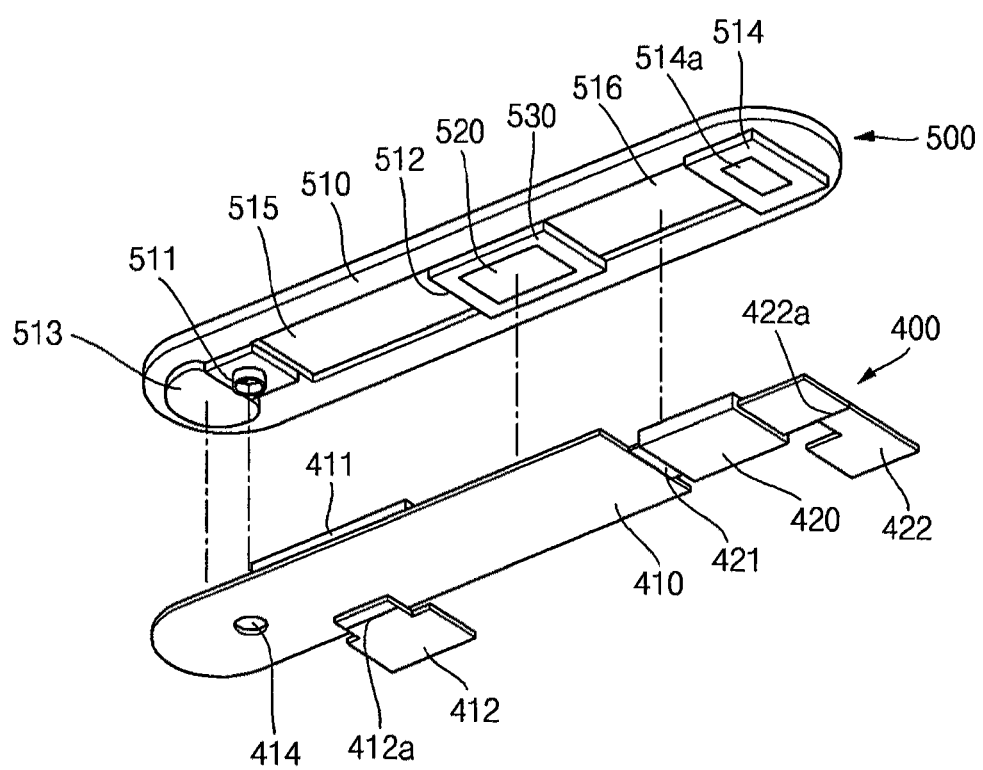
FIG. 3 illustrates a perspective view of a protective circuit module and a bottom surface of a cap assembly in the secondary battery shown in FIG. 1.

Referring to FIG. 3, the positive electrode lead plate 412 may include a first bent portion 412a. The first bent portion 412a may be bent toward the insulating case 300. The positive electrode lead plate 412 may be bent from the first bent portion 412a toward the insulating case 300. The positive electrode lead plate 412 may be welded to the positive electrode tab 210. The positive electrode tab 210 may be electrically connected to a positive electrode of the electrode assembly 200. The welding may be, e.g., resistance welding or laser welding.

A negative electrode pad 413, positioned between the protective circuit element 411 and the first connection terminal 416, may be provided on the top surface of the protective circuit board 410. The negative electrode pad 413 may be electrically connected to the wire pattern. The negative electrode pad 413 may electrically connect a negative electrode terminal 520 and the protective circuit board 410. The negative electrode terminal 520 may be attached to the cap assembly 500.

A first positive electrode pad 415 may be provided on the top surface of the protective circuit board 410. The first positive electrode pad 415 may be electrically connected to the wire pattern. The wire pattern may be electrically connected to the positive electrode lead plate 412. The first positive electrode pad 415 may be electrically connected to a second positive electrode pad 513. The second positive electrode pad 513 may be formed on a bottom surface of the cap assembly 500.

A first hole 414 may penetrate the protective circuit board 410. The first hole 414 may be positioned between the first positive electrode pad 415 and the protective circuit element 411. The first hole 414 may be formed at a location corresponding to the second hole 330 of the insulating case 300, and may have a size and a shape corresponding to the second hole 330. The electrolyte injection hole 511 may be inserted into the first hole 414. The electrolyte injection hole 511 may be formed in the cap assembly 500.

The secondary protective element 420 may include a negative electrode lead plate 422 disposed at one side of the secondary protective element 420. A second connection terminal 421 may be disposed at the other side of the secondary protective element 420. When there is over-current, the secondary protective element 420 may prevent current from flowing through a circuit. When the secondary protective element 420 prevents current from flowing through the circuit, the secondary battery is protected. The secondary protective element 420 may be a thermal fuse, a Positive Temperature Coefficient (PTC) element, a bi-metal element, etc.

The secondary protective element 420 may be electrically connected to the protective circuit board 410 by welding the second connection terminal 421 to a first connection terminal 416. The second connection terminal 420 may be formed at the other side of the secondary protective element 420. The first connection terminal 416 may be formed at one side of the protective circuit board 410. The negative electrode lead plate 422 may be connected to the negative electrode tab 220. Thus, the secondary protective element 420 may be electrically connected to a negative electrode of the electrode assembly 200.

The negative electrode lead plate 422 may include a second bent portion 422a. The second bent portion 422a is bent toward the insulating case 300. The negative electrode lead plate 422 may be bent from the second bent portion 422a toward the insulating case 300. The negative electrode lead plate 422 may be welded to the negative electrode tab 220. The negative electrode tab 220 may be electrically connected to a positive electrode of the electrode assembly 200. The welding may be, e.g., resistance welding or laser welding.

A bottom portion of the protective circuit module 400 may be molded using a resin before being coupled to the upper surface of the electrode assembly 200. The molding may exclude the positive electrode lead plate 412 and the negative electrode lead plate 422. An electrically insulated state may be maintained between the protective circuit module 400 and the electrode assembly 200, the electrically insulated state excluding an electrical connection between the positive electrode tab 210 and the positive electrode lead plate 412, and excluding an electrical connection between the negative electrode tab 220 and the negative electrode lead plate 422. In this scenario, the insulating case 300 may be omitted.

The cap assembly 500 may include a cap plate 510, a negative electrode terminal 520, and an insulation gasket 530. The negative electrode terminal 520 may be inserted into a throughhole 512 passing through the center of the cap plate 510. The insulation gasket 530 may be interposed between the cap plate 510 and the negative electrode terminal 520.

The cap plate 510 may be formed of a metal plate, corresponding in size and shape to the top opening of the can 200 and the insulating case 300. Once the cap plate 510 is coupled to the protective circuit module 400, the cap plate 510 may seal the top opening of the can 200. The cap plate 510 may be coupled to the top opening of the can 200 by resin molding.

The cap plate 510 may include the electrolyte injection hole 511 passing through the cap plate 510. The cap plate 510 may correspond in location to the first hole 414 and the second hole 330. The cap plate 510 may have a size and a shape corresponding to the first hole 414 and the second hole 330. The electrolyte injection hole 511 may be shaped as a protrusion, extending downward from the cap plate 510, and may be inserted into the first hole 414 and the second hole 330. The electrolyte injection hole 511 may allow an electrolyte to flow into the can 100 without leakage between the cap plate 510 and the insulating case 300.

The negative electrode terminal 520 may be inserted into the throughhole 512. The throughhole 512 may pass through the center of the cap plate 510. The insulation gasket 530 may be interposed between the cap plate 510 and the negative electrode terminal 520 to establish electrical insulation.

The negative electrode terminal 520 may be electrically connected to negative electrode pad 413 of the protective circuit board 410. The negative electrode terminal 520 and the negative electrode pad 413 may be coupled to each other by welding. The welding may be, e.g., resistance welding or laser welding.

The insulation gasket 530 may be interposed between the negative electrode terminal 520 and the cap plate 510 (which may have different polarities) to prevent an electrical short.

The second positive electrode pad 513 may be provided on the bottom surface of the other end of the cap assembly 500. The second positive electrode pad 510 may be formed to correspond in location to the first positive electrode pad 415 of the protective circuit board 410. The second positive electrode pad 510 may have a size and a shape corresponding to those of the first positive electrode pad 415. The second positive electrode pad 513 may be made of a conductive material and may be electrically connected to the cap plate 510. The second positive electrode pad 513 may be coupled to the first positive electrode pad 415 by welding. The welding may be, e.g., resistance welding or laser welding.

The cap plate 510 may include a support portion 514 on the bottom surface of one side of the cap plate 510. The support portion 514 may support an unbent portion of the negative electrode lead plate 422. In order to prevent an electric short between the negative electrode lead plate 422 and the cap plate 510, the support portion 514 may be made of electrically insulating material. A welding pad 514a may be provided on the support portion 514. The welding pad 514a may be coupled to the unbent portion of the negative electrode lead plate 422 by welding. The welding may be, e.g., resistance welding or laser welding.

A first receiving groove 515, positioned between the electrolyte injection hole 511 and the insulation gasket 530, may be formed on the bottom surface of the cap plate 510. The first receiving groove 515 may be formed to correspond in location to the protective circuit element 411 of the protective circuit board 410, and may have a size and a shape corresponding to the protective circuit element 411. Therefore, the protective circuit module 400 and the cap assembly 500 may be tightly coupled to each other to minimize the overall volume of the secondary battery.

A second receiving groove 516 positioned between the insulation gasket 530 and the support portion 514 may be formed on the bottom surface of the cap plate 510. The second receiving groove 516 may be formed to correspond in location to the secondary protective element 420, and may have a size and a shape corresponding to the secondary protective element 420. Therefore, the protective circuit module 400 and the cap assembly 500 may be tightly coupled to each other to minimize the overall volume.

According to the present embodiment, the secondary battery may have the protective circuit module 400 coupled to the bottom surface of the cap assembly 500. As shown in FIG. 2, the structure of the bottom surface of the cap plate 510 and the space between the top opening of the can 100 may minimize the volume of the secondary battery. The protective circuit module 400 may be incorporated into the can 100 without occupying additional volume of the secondary battery. Thus, the volume of the secondary battery may be minimized.

In a typical secondary battery, secondary protective devices may be connected to the secondary battery, and accommodated in a battery pack. Secondary protective devices may include a protective thermal coefficient (PTC) element or a battery safety device with a protective circuit module. The battery safety devices may be connected to positive and negative electrodes, respectively. The battery safety devices may shut down a current when the temperature of the battery rises, or when the internal voltage of the battery abruptly increases due to overcharge or overdischarge. Thus, the battery safety devices may prevent rupture of the battery.

In a typical secondary battery, the protective circuit module may be coupled to top of the cap assembly after a top opening of the can is sealed. For example, the can may be sealed with the cap assembly of a prismatic secondary battery. In contrast, in the prismatic secondary battery according to the present embodiment, the protective circuit module may be formed inside the can. Therefore, a space occupied by a protective circuit module may be reduced. Thus, overall volume of the battery may be reduced and more capacity may be secured in a unit volume.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the inventive concept as set forth in the following claims.

What is claimed is:

1. A secondary battery, comprising:
   an electrode assembly having a positive electrode tab and a negative electrode tab;
   a can housing the electrode assembly;
   a cap assembly sealing a top opening of the can;
   a protective circuit module in a space between the cap assembly and the electrode assembly; and
   an insulating case on the electrode assembly, the insulating case being between the protective circuit module and the electrode assembly, and the insulating case including:
   a second hole, sidewalls of an electrolyte injection hole in a cap plate extending vertically into the second hole, and the sidewalls of the electrolyte injection hole completely separate an interior of the second hole of the insulating case from a space between the cap plate and an upper surface of the insulating case,
   a positive electrode tab hole through which the positive electrode tab passes, and
   a negative electrode tab hole through which the negative electrode tab passes.

2. The secondary battery as claimed in claim 1, wherein the insulating case is made of electrically insulating material.

3. The secondary battery as claimed in claim 1, wherein the protective circuit module includes a protective circuit board with a secondary protective device, the secondary protective device being electrically connected to the protective circuit board to prevent current from flowing through a circuit when there is an over-current condition.

4. The secondary battery as claimed in claim 3, wherein the protective circuit module further includes a protective circuit element for charging and discharging operations.

5. The secondary battery as claimed in claim 3, wherein:
   the protective circuit module includes a positive electrode lead plate near the positive electrode tab, and
   the secondary protective device includes a negative electrode lead plate at one side of the secondary protective device.

6. The secondary battery as claimed in claim 5, wherein the positive electrode lead plate is electrically connected to the positive electrode tab, and the negative electrode lead plate is electrically connected to the negative electrode tab.

7. The secondary battery as claimed in claim 5, wherein a bottom of the protective circuit module, excluding the positive electrode lead plate and the negative electrode lead plate, is molded using a resin.

8. The secondary battery as claimed in claim 1, wherein the cap assembly includes:
   a cap plate;
   an electrode terminal inserted into a throughhole passing through the center of the cap plate; and
   an insulation gasket insulating the cap plate and the electrode terminal from each other.

9. The secondary battery as claimed in claim 8, wherein the electrode terminal and the cap plate have different polarities.

10. The secondary battery as claimed in claim 8, wherein a first receiving groove is on a bottom surface of the cap plate, the first receiving groove being at a location corresponding to a protective circuit element on the protective circuit module, the first receiving groove having a size and a shape corresponding to the protective circuit element.

11. The secondary battery as claimed in claim 10, wherein a second receiving groove is on a bottom surface of the cap plate, the second receiving groove being at a location corresponding to a secondary protective device, the second receiving groove having a size and a shape corresponding to the secondary protective device.

12. The secondary battery as claimed in claim 8, wherein a second positive electrode pad is on the bottom surface of the cap plate, and a first positive electrode pad is on the top surface of the protective circuit module, the first positive electrode pad being electrically connected to the second positive electrode pad.

13. The secondary battery as claimed in claim 12, wherein a negative electrode pad is on the top surface of the protective circuit module, corresponding to the location of the electrode terminal, the negative pad being electrically connected to the electrode terminal.

14. The secondary battery as claimed in claim 13, wherein the second positive electrode pad and the first positive electrode pad are coupled to each other by welding, and the electrode terminal and the negative electrode pad are coupled to each other by welding.

15. The secondary battery as claimed in claim 1, further comprising a label surrounding an outer surface of the can.

16. The secondary battery as claimed in claim 1, wherein the protective circuit module is enclosed inside a same number of cans as the electrode assembly.

17. The secondary battery as claimed in claim 1, wherein:
   the electrode assembly, the insulating case, and the protective circuit module are stacked directly on top of each other, in the stated order, inside the can, and
   sidewalls of the can continuously extend beyond the electrode assembly to contact the cap assembly, the space between the cap assembly and the electrode assembly being completely surrounded by the sidewalls of the can.

* * * * *